Jan. 30, 1923.

G. W. GOSLINE.
PROPELLING MECHANISM FOR AIRPLANES.
FILED APR. 25, 1921.

1,443,572

2 SHEETS-SHEET 1

Inventor
G. W. Gosline
by Larpham
Atty.

Jan. 30, 1923.
G. W. GOSLINE.
PROPELLING MECHANISM FOR AIRPLANES.
FILED APR. 25, 1921.
1,443,572
2 SHEETS-SHEET 2
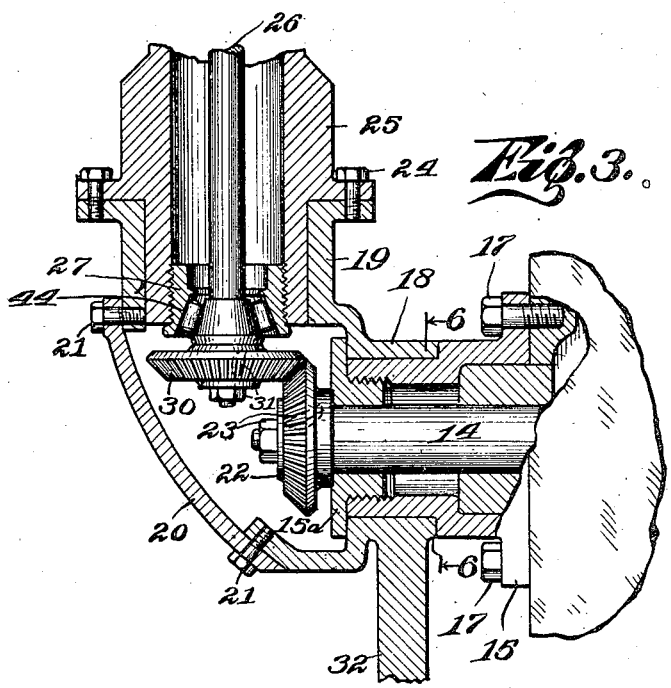
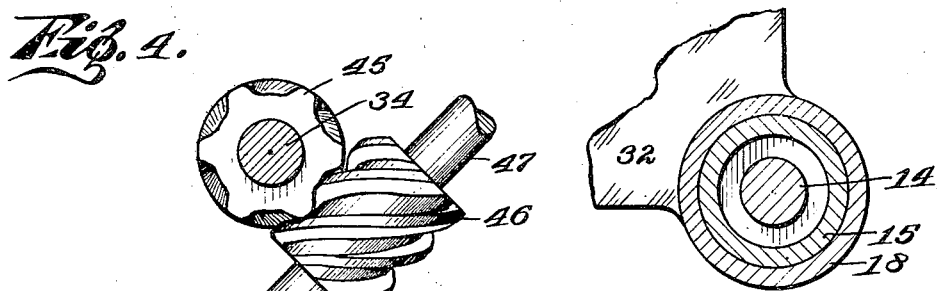
Inventor,
G. W. Gosline
by C. B. Impham
Att'y.

Patented Jan. 30, 1923.

1,443,572

UNITED STATES PATENT OFFICE.

GEORGE W. GOSLINE, OF SANTA PAULA, CALIFORNIA.

PROPELLING MECHANISM FOR AIRPLANES.

Application filed April 25, 1921. Serial No. 464,343.

*To all whom it may concern:*

Be it known that I, GEORGE W. GOSLINE, a citizen of the United States, residing at Santa Paula, in the county of Ventura, State of California, have invented new and useful Improvements in Propelling Mechanism for Airplanes, of which the following is a specification.

My invention relates to machines for aerial navigation; and the object thereof is to provide efficient mechanism for an airplane to lift and lower the machine in a vertical direction, and to drive the same in any direction when sufficient elevation above the earth's surface has been reached.

Figure 1:
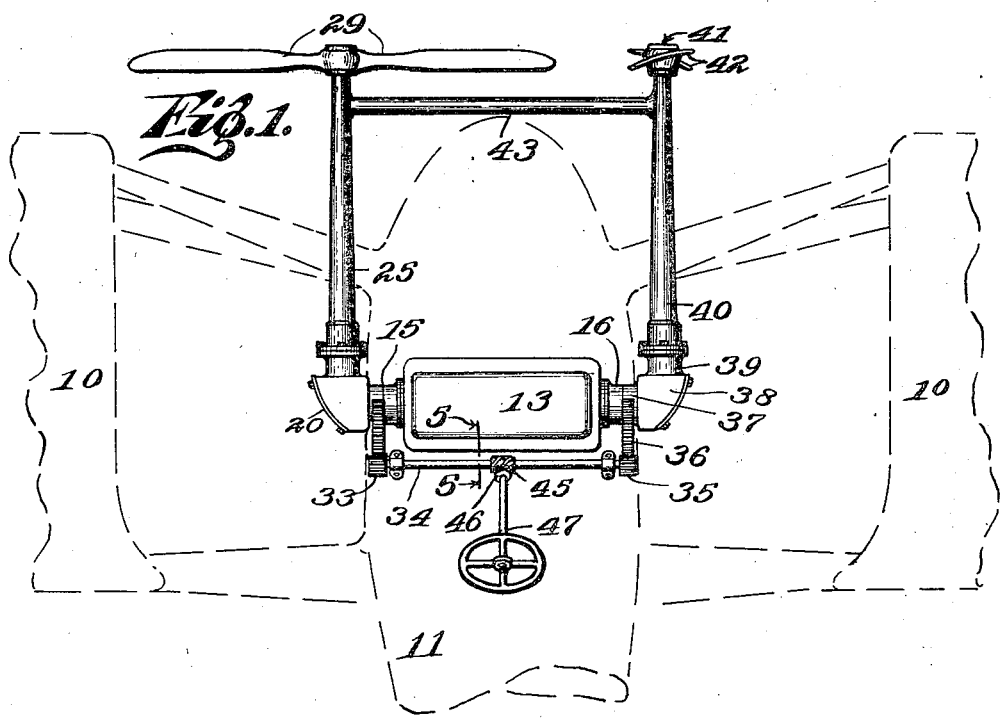
Figure 2:
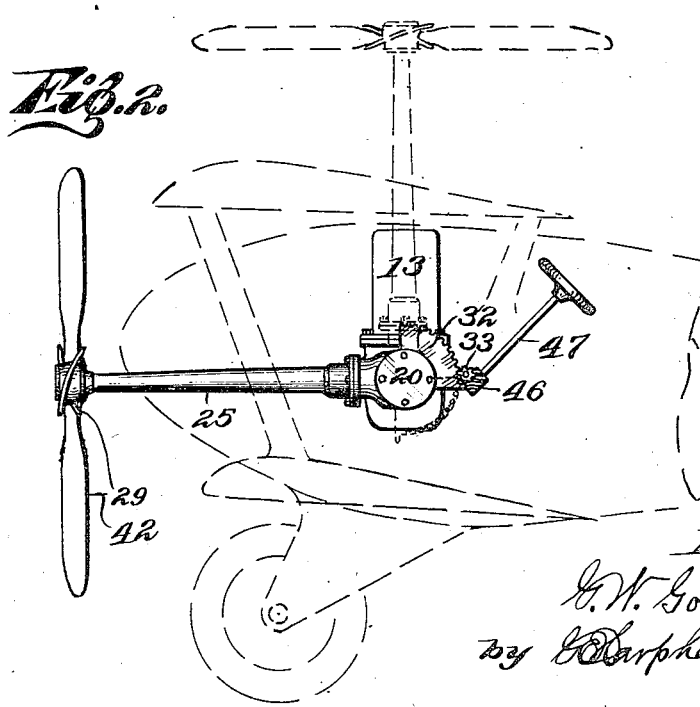

In the drawings forming a part of this application Fig. 1 is a top plan of a machine equipped with my improved mechanism. Fig. 2 is a side elevation of a portion of the driving mechanism. Fig. 3 is an enlarged detail of the connection of a propeller shaft to the engine with a gear case in section. Fig. 4 is a section on the line 5—5 of Fig. 1. Fig. 5 is a section on the line 6—6 of Fig. 3.

Referring to the drawings 10 are the planes and 11 the body of the machine and may be of any desired type, but preferably of the biplane type. Mounted in the forward end of the lower portion of the body of the machine and secured to the frame in any suitable way is an engine 13, which has a driving shaft 14 that projects from each end thereof. Shaft 14 is supported in bearings 15 and 16 which are alike at both ends and only one is shown in detail in Fig. 3 and only one will be described. Bearing 15 is secured to the frame in any suitable manner and to the engine by bolts 17. On bearing 15 is revolubly mounted hub 18 of gear case or housing 19. Hub 18 is held positioned on bearing 15 by flanged bearing 15ᵉ. Case 19 has a removable front 20 which is held in place by bolts 21 and when removed permits bevel gear 22 to be positioned on shaft 14, being secured thereon by a spline, (not shown) and by nut 23. Secured to case 19 by bolts 24 is the driver shaft housing 25 containing the propeller shaft 26 which passes through rear bearing 27 screwed into the end of housing 25. Housing 25 has a front bearing, not shown in detail, through which shaft 26 passes. On the outer end of shaft 26 are the propeller blades 29. A bevel gear 30 meshes with gear 22 and is secured upon the inner end of shaft 26 by a spline (not shown), and by nut 31. Before the front 20 is secured in place, the gear case is filled with hard grease or oil (not shown), thereby permitting the gears to run in a lubricant, thus reducing friction and noise. To hub 18 is secured a toothed quadrant 32 which is engaged by a pinion 33 on shaft 34. On the other end of shaft 34 is a pinion 35 which engages toothed quadrant 36 on hub 37 of gear case 38 in which are bevel gears and bearings of the same construction as those in case 19. To arm 39 of case 38 is secured propeller shaft housing 40 through which runs propeller shaft 41 to which is secured propeller blades 42 set at right angles to blades 29. Housings 40 and 25 are connected by a rigid brace 43. The propeller shaft bearings may have rollers 44 or balls and stuffing boxes, not shown, are provided to keep the grease from escaping into the propeller shaft housings. On shaft 34 is a worm gear 45 that is engaged by a worm 46 on control shaft 47 which is operated by the pilot to control the position of the propellers.

By this construction the propeller shafts are driven direct from the engine shaft thereby providing compactness and the use of the smallest number of parts, and these parts can be run in oil or grease. It will also be seen that the propeller blades can be positioned in a plane, at right angles to the longitudinal horizontal plane of the body or in a plane parallel thereto or at any intermediate angle to said plane thereby enabling the driver to ascend or descend vertically or to drive the machine in any direction when sufficient elevation has been attained. He can also hover in the air like a bird.

Having described my invention I claim.

In an airplane the combination of a frame; an engine mounted therein, said engine having a driving shaft; bevel gears mounted on said shaft; bearings for said shaft secured to said engine; gear housings having removable covers rotatively mounted on said bearings; other bearings for said shaft, said last bearings being secured to said first bearings and adapted to fasten said housings upon said first bearings; propeller shafts housings secured to said gear housings; propeller shafts in said shaft housings; propeller blades on said propeller shafts; bevel gears on said propeller shafts and meshing with the engine shaft gears; toothed quadrants secured to said gear housings; a control shaft; pinions on said control shaft meshing with said quadrants; a worm gear on said control shaft; an operating shaft; and a worm on said last shaft engaging said worm gear, and a housing for said parts.

In witness that I claim the foregoing I have hereunto subscribed my name this 12th day of April, 1921.

GEORGE W. GOSLINE.